US012775441B2

(12) United States Patent
Zeng

(10) Patent No.: US 12,775,441 B2
(45) Date of Patent: Oct. 27, 2026

(54) VOLUME ADJUSTMENT METHOD AND APPARATUS, AND EARPHONE, ELECTRONIC DEVICE, AND READABLE STORAGE MEDIUM

(71) Applicant: Goertek Inc., Weifang (CN)

(72) Inventor: Kai Zeng, Shandong (CN)

(73) Assignee: Goertek Inc., Weifang (CN)

( * ) Notice: Subject to any disclaimer, the term of this patent is extended or adjusted under 35 U.S.C. 154(b) by 140 days.

(21) Appl. No.: 18/867,887

(22) PCT Filed: Jun. 29, 2022

(86) PCT No.: PCT/CN2022/102138
§ 371 (c)(1),
(2) Date: Nov. 21, 2024

(87) PCT Pub. No.: WO2023/231113
PCT Pub. Date: Dec. 7, 2023

(65) Prior Publication Data

US 2025/0315201 A1 Oct. 9, 2025

(30) Foreign Application Priority Data

May 30, 2022 (CN) ........................ 202210605167.5

(51) Int. Cl.
*G06F 3/16* (2006.01)
*H04R 1/10* (2026.01)

(52) U.S. Cl.
CPC ........... *G06F 3/165* (2013.01); *H04R 1/1041* (2013.01); *H04R 2420/07* (2013.01); *H04R 2430/01* (2013.01)

(58) Field of Classification Search
CPC ... G06F 3/165; H04R 1/1041; H04R 2420/07; H04R 2430/01; H04R 5/04; H04R 3/00; H04R 5/033; H04R 1/10; H04R 1/1083; H04R 1/22
See application file for complete search history.

(56) References Cited

U.S. PATENT DOCUMENTS

2009/0245550 A1* 10/2009 Dai ...................... H04R 1/1041 381/311
2014/0064503 A1* 3/2014 Ko ...................... H04R 29/001 381/59
2017/0366891 A1* 12/2017 Yang .................... G06F 3/0304
(Continued)

FOREIGN PATENT DOCUMENTS

CN 105704619 A 6/2016
CN 111464911 A * 7/2020 ............... H04R 1/10
(Continued)

*Primary Examiner* — Oyesola C Ojo
(74) *Attorney, Agent, or Firm* — Baker Botts LLP

(57) ABSTRACT

The present disclosure relates to a volume adjustment method and apparatus, and an earphone, an electronic device, and a readable storage medium. The method includes: acquiring a first volume at which a first audio data sent from an electronic device is played, upon receiving the first audio data; receiving a second volume sent from the electronic device at which the first audio data is played by at least one second earphone; adjusting the first volume at which the first audio data is played, based on the second volume at which the first audio data is played by the at least one second earphone.

12 Claims, 4 Drawing Sheets

(56) References Cited

U.S. PATENT DOCUMENTS

| | | | | |
|---|---|---|---|---|
| 2020/0007989 | A1 * | 1/2020 | Gong | H04R 1/1025 |
| 2020/0382870 | A1 * | 12/2020 | Dyrholm | H04R 5/033 |
| 2021/0152914 | A1 * | 5/2021 | Gong | H04R 1/1041 |
| 2022/0405043 | A1 * | 12/2022 | Mogul | G06F 3/162 |
| 2023/0354450 | A1 * | 11/2023 | Zheng | H04R 5/033 |
| 2024/0289088 | A1 * | 8/2024 | Zhu | G06F 3/16 |
| 2024/0370224 | A1 * | 11/2024 | Li | H04R 3/00 |

FOREIGN PATENT DOCUMENTS

| | | | | | |
|---|---|---|---|---|---|
| CN | 212344034 | U | * | 1/2021 | H04R 1/10 |
| CN | 113645573 | A | | 11/2021 | |

* cited by examiner

VOLUME ADJUSTMENT METHOD AND APPARATUS, AND EARPHONE, ELECTRONIC DEVICE, AND READABLE STORAGE MEDIUM

CROSS-REFERENCE TO RELATED APPLICATIONS

The present disclosure is a National Stage of International Application No. PCT/CN2022/102138, filed on Jun. 29, 2022, which claims priority to a Chinese patent application No. 202210605167.5 filed with the CNIPA on May 30, 2022 and entitled "Volume Adjustment Method and Apparatus, and Earphone, Electronic Device, and Readable Storage Medium", both of which are hereby incorporated by reference in their entireties.

TECHNICAL FIELD

The present disclosure relates to the technical field of a wireless earphones, and particularly to a volume adjustment method and apparatus, and an earphone, an electronic device and a readable storage medium.

BACKGROUND

With the increasing demand for portability from users, Bluetooth earphones are becoming increasingly favored. Bluetooth earphones can establish a wireless connection with an electronic device such as a mobile phone, thereby cooperating with the electronic device to play music or make/receive phone calls for the users.

In the prior art, wireless earphones have an adaptive volume adjustment function, for example, by detecting environmental noise and adjusting the volume accordingly. However, this method places high demands on the hardware conditions and algorithms of the earphone, and often fails to meet user expectations due to limitations in algorithm performance.

Therefore, it is necessary to provide a new volume adjustment solution that can achieve adaptive volume adjustment of the earphones, thereby bringing users a more convenient audio experience.

SUMMARY

An objective of the present disclosure is to provide a volume adjustment method and apparatus, an earphone, an electronic device, and a readable storage medium, which can achieve adaptive volume adjustment of the earphones, thereby bringing users a more convenient audio experience.

According to a first aspect of the present disclosure, a volume adjustment method is provided, which is applied to a first earphone and includes:

- acquiring a first volume at which a first audio data sent from an electronic device is played, upon receiving the first audio data;
- receiving a second volume at which the first audio data is played by at least one second earphone, sent from the electronic device; and
- adjusting the first volume at which the first audio data is played, based on the second volume at which the first audio data is played by the at least one second earphone.

Optionally, upon receiving a second volume at which the first audio data is played by one second earphone sent from the electronic device, said "adjusting the first volume at which the first audio data is played, based on the second volume at which the first audio data is played by the at least one second earphone" includes:

- when the first volume is inconsistent with the second volume, determining a volume offset based on the first volume and the second volume; and
- when the volume offset is less than a first threshold and the second volume is less than a second threshold, adjusting the first volume at which the first audio data is played to the second volume.

Optionally, after said "determining a volume offset based on the first volume and the second volume", the method further includes:

- when the volume offset is greater than or equal to the first threshold and the second volume is less than the second threshold, issuing a first prompt message; and
- upon receiving a confirmation command for the first prompt message from a user, adjusting the first volume at which the first audio data is played to the second volume.

Optionally, upon receiving the second volumes at which the first audio data is played by N second earphones sent from the electronic device, said "adjusting the first volume at which the first audio data is played, based on the second volume at which the first audio data is played by the at least one second earphone" includes:

- determining a third volume based on the second volumes at which the first audio data is played by each of the N second earphones, wherein N is a positive integer greater than 1;
- when the first volume is inconsistent with the third volume, determining a volume offset based on the first volume and the third volume; and
- when the volume offset is less than the first threshold and the third volume is less than the second threshold, adjusting the first volume at which the first audio data is played to the third volume.

Optionally, after said "determining a volume offset based on the first volume and the third volume", the method further includes:

- when the volume offset is greater than or equal to the first threshold and the third volume is less than the second threshold, issuing a second prompt message; and
- upon receiving a confirmation command for the second prompt message from a user, adjusting the first volume at which the first audio data is played to the third volume.

According to a second aspect of the present disclosure, a volume adjustment method is provided, which is applied to an electronic device, and includes:

- receiving a second volume at which a first audio data is played sent from at least one second earphone; and
- sending the second volume at which the first audio data is played by the at least one second earphone to a first earphone, so that the first earphone adjusts volume based on the second volume at which the first audio data is played by the at least one second earphone.

Optionally, before said "receiving a second volume at which a first audio data is played sent from at least one second earphone", the method further includes:

- establishing a communication connection with the at least one second earphone when an audio sharing function is enabled; and
- sending the first audio data to the at least one second earphone based on the established communication connection with the at least one second earphone, so that the at least one second earphone plays the first audio data.

According to a third aspect of the present disclosure, a volume adjustment apparatus is provided, which is applied to a first earphone, and includes:

an acquiring module configured for acquiring a first volume at which a first audio data sent from an electronic device is played, upon receiving the first audio data;

a receiving module configured for receiving a second volume at which the first audio data is played by at least one second earphone, sent from the electronic device; and an adjusting module configured for adjusting the first volume at which the first audio data is played, based on the second volume at which the first audio data is played by the at least one second earphone.

According to a fourth aspect of the present disclosure, a volume adjustment apparatus is provided, which is applied to an electronic device, and includes:

a receiving module configured for receiving a second volume at which a first audio data is played sent from at least one second earphone; and a first sending module configured for sending the second volume at which the first audio data is played by the at least one second earphone to a first earphone, so that the first earphone adjusts volume based on the second volume at which the first audio data is played by the at least one second earphone.

According to a fifth aspect of the present disclosure, an earphone is provided, including:

a memory configured for storing an executable computer instruction;

a processor configured for executing the volume adjustment method of the first aspect of the present disclosure based on control of the executable computer instruction.

According to a sixth aspect of the present disclosure, an electronic device is provided, including:

a memory configured for storing an executable computer instruction;

a processor configured for executing the volume adjustment method of the second aspect of the present disclosure based on control of the executable computer instruction.

According to a seventh aspect of the present disclosure, a computer-readable storage medium is provided, which stores a computer instruction thereon, and when run by a processor, executes the volume adjustment method of the first aspect of the present disclosure, or executes the volume adjustment method of the second aspect of the present disclosure.

According to the present disclosure, when an electronic device shares audio with at least one second earphone through the first earphone, acquire a first volume at which a first audio data sent from the electronic device is played by the first earphone, and receive a second volume at which the first audio data is played by at least one second earphone sent from the electronic device, so as to adjust the volume of the first earphone based on the second volume at which the first audio data is played by at least one second earphone. In this way, since the second volume at which the first audio data is played by at least one second earphone can reflect the noise in the application environment, it is possible to adaptively adjust the volume based on the second volume at which the first audio data is played by at least one second earphone, thereby achieving automatic volume adjustment with high precision and providing a more convenient audio experience for the user. Furthermore, the audio adjustment method provided in the present embodiment has lower demands on the hardware conditions and algorithms of the earphones, making it more widely applicable.

Other features and advantages of the present disclosure will become clear by the following detailed description of exemplary embodiments of the present disclosure with reference to the accompanying drawings.

BRIEF DESCRIPTION OF THE DRAWINGS

In order to illustrate the technical solution of the present disclosure more clearly, the accompanying drawings needed in the embodiments will be briefly described below. It should be understood that the following drawings show only some embodiments of the present disclosure and should not be regarded as limiting the scope. For those skilled in the art, other relevant drawings can also be obtained based on these drawings without creative effort.

DETAILED DESCRIPTION

Various exemplary embodiments of the present disclosure will now be described in detail with reference to the accompanying drawings. It is to be noted that unless otherwise specified, the relative arrangements, numerical expressions and values of components and steps illustrated in the embodiments do not limit the scope of the present disclosure.

The description of at least one exemplary embodiment is for illustrative purpose only and in no way implies any restriction on the present disclosure, its application, or use.

Techniques, methods and devices known to those skilled in the prior art may not be discussed in detail; however, such techniques, methods and devices shall be regarded as part of the description where appropriate.

In all the examples illustrated and discussed herein, any specific value shall be interpreted as illustrative rather than restrictive. Therefore, other examples of the exemplary embodiments may have different values.

It is to be noted that similar reference numbers and alphabetical letters represent similar items in the accompanying drawings. Once an item is defined in one drawing, further reference to it may be omitted in subsequent drawings.

Currently, electronic devices offer an audio sharing function. Taking an electronic device as an example, when a user listens to music or watches videos through the electronic device, the user and other user's earphones are connected to the electronic device via Bluetooth. This allows different users to play the audio data transmitted by the electronic device through their respective earphones using the audio sharing function of the electronic device.

Moreover, the electronic device also provides an adaptive volume adjustment function, for example, by detecting ambient noise and adjusting the volume accordingly to the environmental noise.

The aforementioned adaptive volume adjustment method, on one hand, places high demands on the hardware conditions and algorithms of the earphones, and often fails to meet user expectations due to limitations in algorithm performance. On the other hand, when multiple users share audio using earphones, each user adjusts the volume of their earphones based on the ambient noise, leading to a poor user experience.

To address the above technical issues, the present disclosure provides a volume adjustment method. This method adjusts the volume at which the first audio data is played by the first earphone based on the volume at which the first audio data is played by the at least one second earphone. This can achieve adaptive volume adjustment in an audio sharing scenario, thereby providing a more convenient audio experience for the user.

The following will provide a detailed explanation of the volume adjustment solution provided by the present disclosure, in conjunction with the drawings, through specific embodiments and their application scenarios.

<Hardware Configuration>

Figure 1:
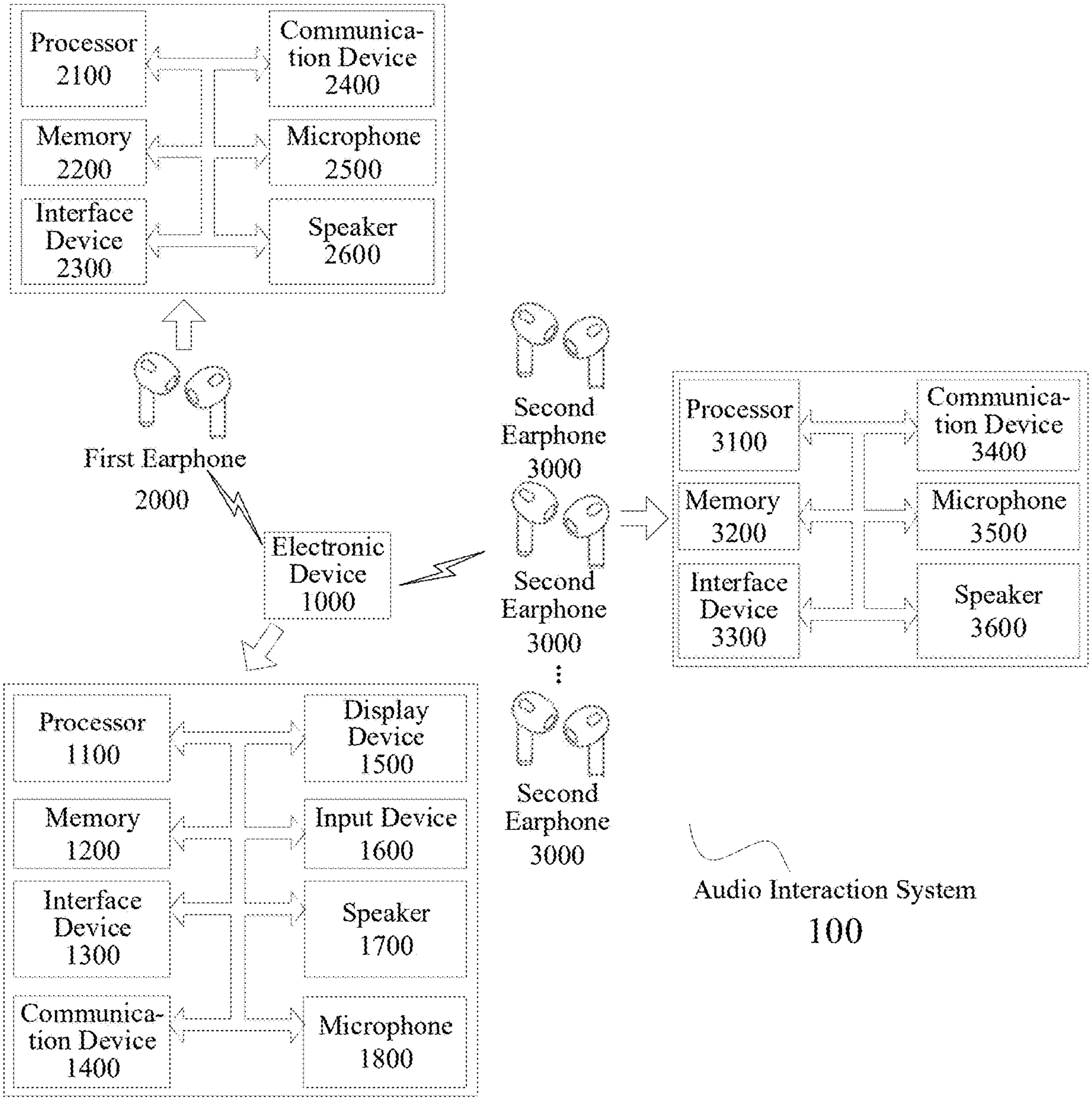
FIG. 1 is a schematic diagram of a hardware configuration of an audio interaction system that may be used to implement a volume adjustment method of an embodiment.

FIG. 1 is a schematic diagram of a hardware configuration of an audio interaction system that may be used to implement a volume adjustment method according to an embodiment.

As shown in FIG. 1, the audio interaction system 100 may include an electronic device 1000, a first earphone 2000, and multiple second earphones 3000.

In the present embodiment, the electronic device 1000 establishes a communication connection with the first earphone 2000. The electronic device 1000, for example, may be a mobile phone, a portable computer, a tablet computer, a palmtop computer, etc., which is not limited herein.

In one embodiment, as shown in FIG. 1, the electronic device 1000 may include a processor 1100, a memory 1200, an interface device 1300, a communication device 1400, a display device 1500, an input device 1600, a microphone 1700, and a speaker 1800. The processor 1100 may include but is not limited to a central processing unit (CPU), a microcontroller unit (MCU), etc. The memory 1200, for example, includes read-only memory (ROM), random access memory (RAM), non-volatile memory such as a hard disk, etc. The interface device 1300, for example, includes various bus interfaces, such as serial bus interfaces (including USB interfaces), parallel bus interfaces, etc. The communication device 1400, for example, is capable of wired or wireless communication. The display device 1500, for example, is a liquid crystal display, an LED display, a touch screen display, etc. The input device 1600, for example, includes a touch screen, a keyboard, etc. The microphone 1700 may be used to input voice information. The speaker 1800 may be used to output voice information.

Although multiple devices of the electronic device 1000 are shown in FIG. 1, the present disclosure may only involve some of the devices. For example, the electronic device 1000 may only involve the processor 1100, the memory 1200, and the communication device 1400.

In the present embodiment, the memory 1200 of the electronic device 1000 is configured for storing program instructions, which is configured for controlling the processor 1100 to perform operations to execute the volume adjustment method. Technicians may design instructions according to the solution applied for in the present disclosure. How the instructions control the processor to operate is well known in this field, and is not described in detail herein.

In one embodiment, as shown in FIG. 1, the first earphone 2000 may include a processor 2100, a memory 2200, an interface device 2300, a communication device 2400, a microphone 2500, and a speaker 2600. The processor 2100 may include but is not limited to a central processing unit (CPU), a microcontroller unit (MCU), etc. The memory 2200, for example, includes read-only memory (ROM), random access memory (RAM), non-volatile memory such as a hard disk, etc. The interface device 2300, for example, includes various bus interfaces, such as serial bus interfaces (including USB interfaces), parallel bus interfaces, etc. The communication device 2400, for example, is capable of wired or wireless communication, such as a Bluetooth communication device. The microphone 2500 may be used to input voice information. The speaker 2600 may be used to output voice information.

Although multiple devices of the first earphone 2000 are shown in FIG. 1, the present disclosure may only involve some of the devices.

In one embodiment, the first earphone 2000, for example, may be TWS earphones, etc.

In the present embodiment, the memory 2200 of the first earphone 2000 is configured for storing a program instruction, which is configured for controlling the processor 2100 to perform operations to execute the volume adjustment method. Technicians may design instructions according to the solution applied for in the present disclosure. How the instructions control the processor to operate is well known in this field, so it is not described in detail herein.

The first earphone 2000 shown in FIG. 1 is illustrative and is by no means intended to limit the present disclosure, its application, or use.

In one embodiment, as shown in FIG. 1, the second earphone 3000 may include a processor 3100, a memory 3200, an interface device 3300, a communication device 3400, a microphone 3500, and a speaker 3600. The processor 3100 may include but is not limited to a central processing unit (CPU), a microcontroller unit (MCU), etc. The memory 3200, for example, includes read-only memory (ROM), random access memory (RAM), non-volatile memory such as a hard disk, etc. The interface device 3300, for example, includes various bus interfaces, such as serial bus interfaces (including USB interfaces), parallel bus interfaces, etc. The communication device 3400, for example, is capable of wired or wireless communication, such as a Bluetooth communication device. The microphone 3500 may be used to input voice information. The speaker 3600 may be used to output voice information.

Although multiple devices of the second earphone 3000 are shown in FIG. 1, the present disclosure may only involve some of the devices.

In one embodiment, the second earphone 3000, for example, may be TWS earphones, etc.

In the present embodiment, the memory 3200 of the second earphone 3000 is configured for storing program instructions, which are configured for controlling the processor 3100 to perform operations to execute the volume adjustment method. Technicians may design the instructions according to the solution applied for in the present disclosure. How the instructions control the processor to operate is well known in this field, so it is not described in detail herein.

The second earphone 3000 shown in FIG. 1 is illustrative and is by no means intended to limit the present disclosure, its application, or use.

In the above description, technicians may design instructions according to the solution provided by the present disclosure. How the instructions control the processor to operate is well known in this field, so it is not described in detail herein.

Embodiments of Method

Figure 2:
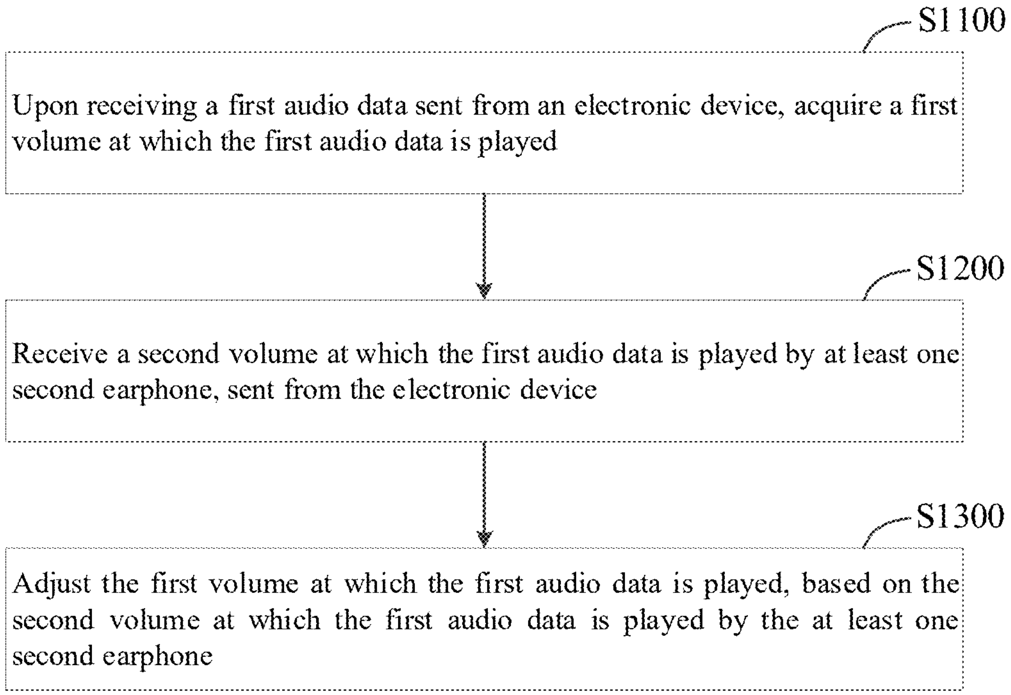
FIG. 2 is a schematic flowchart of a volume adjustment method according to one embodiment.

The present disclosure provides a volume adjustment method that may be implemented by the first earphone 2000 as shown in FIG. 1. As shown in FIG. 2, the volume adjustment method includes the following steps: step S1100 to step S1300.

Step S1100, upon receiving the first audio data sent from the electronic device, acquire the first volume at which the first audio data is played.

In the present embodiment, the electronic device has an audio sharing function. When the audio sharing function is enabled, the electronic device may share audio through the first earphone and at least one second earphone. Specifically, the electronic device may serve as the output end of the audio data in the audio sharing scenario. The first earphone may serve as one receiving end of the audio data in the audio sharing scenario. The second earphone may serve as another receiving end of the audio data in the audio sharing scenario. The first audio data may be the audio data intended for audio sharing.

Exemplarily, when the first user uses the first earphone to play the first audio data transmitted by the electronic device, the first user may enable the audio sharing function of the electronic device. When the audio sharing function is enabled, the electronic device may broadcast the first audio data and transmit the first audio data to at least one second earphone based on the communication connection established with at least one second earphone, enabling at least one second user to use the second earphone to play the first audio data, thereby achieving audio sharing.

The first volume may be the volume at which the first audio data is played by the first earphone. In actual implementation, when the first user plays the first audio data by the first earphone, the volume at which the first audio data is played by the first earphone can be adjusted according to actual needs, so that the current volume at which the first audio data is played by the first earphone can be taken as the first volume.

Step S1200, Receive a second volume at which the first audio data is played by at least one second earphone sent from the electronic device.

In the present embodiment, the second earphone may act as another receiving end for the audio data in the audio sharing scenario. The second earphone may establish a Bluetooth communication connection with the electronic device. There may be provided one second earphone or a plurality of second earphones, and may be provided according to actual needs, which is not limited herein.

The second volume may be the volume at which the first audio data is played by the second earphone. In specific implementation, when the audio sharing function of the electronic device is enabled, the electronic device may establish a communication connection with the second earphone, and send the first audio data to the second earphone based on the connection between the electronic device and the second earphone, enabling the second earphone to play the first audio data. Additionally, based on the communication connection between the electronic device and the second earphone, the second earphone may report the second volume at which the first audio data is played back to the electronic device. Then, based on the communication connection between the electronic device and the first earphone, the electronic device may send the second volume at which the first audio data is played by the second earphone to the first earphone.

It is understood that, for example, when multiple second earphones are involved, each of the multiple second earphones must report the second volume at which the first audio data is played to the electronic device when the audio sharing function is enabled.

It is also understood that the second earphone may report the second volume at which the first audio data is played at preset time intervals, or it may report the second volume when there is a change in the second volume at which the first audio data is played.

Step S1300, Adjust the first volume at which the first audio data is played, based on the second volume at which the first audio data is played by the at least one second earphone.

In the present embodiment, the electronic device shares audio through the first earphone and at least one second earphone, with both the first earphone and at least one second earphone being in the same application environment. Based on this, it is possible to adjust the first volume at which the first audio data is played by the first earphone based on the second volume at which the first audio data is played by at least one second earphone, thus achieving adaptive volume adjustment for the first earphone.

Exemplarily, the first earphone adjusting the volume based on the second volume at which the first audio data is played by at least one second earphone, may involve adjusting the first volume at which the first audio data is played by the first earphone to be the same as the second volume at which the first audio data is played by at least one second earphone. Alternatively, the first earphone adjusting the volume based on the second volume at which the first audio data is played by at least one second earphone, may also involve determining a volume adjustment value based on the second volume at which the first audio data is played by at least one second earphone and then adjusting the first volume at which the first audio data is played by the first earphone according to the volume adjustment value.

In the following, steps of adjusting the volume at which the first audio data is played by the first earphone are described in a specific embodiment.

In one embodiment, upon receiving a second volume at which the first audio data is played by one second earphone sent from the electronic device, said "adjusting the first volume at which the first audio data is played, based on the second volume at which the first audio data is played by the at least one second earphone" may further include: step S2100 to step S2200.

Step S2100, when the first volume is inconsistent with the second volume, determine a volume offset based on the first volume and the second volume.

The case where the first volume is inconsistent with the second volume may include the case where the first volume is inconsistent with the second volume that the first earphone first received, and may also include the case where the first volume is inconsistent with the adjusted second volume.

The volume offset may reflect the difference between the first volume and the second volume. Exemplarily, the first volume at which the first audio data is played by the first earphone is $vol_0$, and the second volume at which the first audio data is played by the second earphone is $vol_1$, then the volume offset may be a percentage of the absolute value of the difference between the first volume and the second volume relative to the first volume, that is, $$\frac{|vol_0 - vol_1|}{vol_0} \times 100\ \%.$$

Step S2200, when the volume offset is less than a first threshold and the second volume is less than a second threshold, adjust the first volume at which the first audio data is played to the second volume.

The first threshold may be the maximum adjustment range for adaptively adjusting the first volume. The first threshold may be 10%. It should be noted that the first threshold may be set by those skilled in the art according to actual experience, which is not limited herein.

The second threshold may be the maximum volume allowed for adaptive adjustment, it indicates that the second threshold may be the maximum volume that does not harm human hearing. For example, the second threshold may be 80% of the maximum volume that the earphone may play. It should be noted herein that the second threshold may be set by those skilled in the art according to actual experience, which is not limited herein.

When the volume offset is less than the first threshold and the second volume is less than the second threshold, it indicates that the difference between the current first volume and the second volume is minor, and the second volume has not exceeded the threshold that could harm hearing. Therefore, it is assumed that the change in the first volume will not impact the audio experience of the user of the first earphone. At this time, the first volume at which the first audio data is played by the first earphone can be automatically adjusted to the second volume.

In the present embodiment, when the first volume at which the first audio data is played by the first earphone is inconsistent with the second volume at which the first audio data is played by the second earphone, acquire the volume offset reflecting the difference between the first volume and the second volume. When the volume offset is less than the first threshold and the second volume is less than the second threshold, the first volume at which the first audio data is played by the first earphone is adjusted to the second volume. In this way, after the user of the second earphone adjusts the volume according to the application environment, the first earphone may acquire the volume at which the first audio data is played by the second earphone, and adjust the volume at which the first audio data is played by the first earphone to the corresponding second volume of the second earphone, achieving adaptive volume adjustment of the earphone while ensuring the precision of the adjustment, thus providing users a more convenient audio experience.

In one embodiment, after said "determining a volume offset based on the first volume and the second volume", the method may further include: when the volume offset is greater than or equal to the first threshold and the second volume is less than the second threshold, issuing a first prompt message; upon receiving a confirmation command for the first prompt message from a user, adjusting the first volume at which the first audio data is played to the second volume.

In the present embodiment, by issuing the first prompt message, the user can be reminded to confirm whether to adjust the volume at which the first audio data is played. The first prompt message can be a voice prompt message or a vibration prompt message, etc. For example, the first prompt message might read "Please confirm whether to adjust the current playback volume."

When the volume offset is greater than or equal to the first threshold and the second volume is less than the second threshold, it indicates that the difference between the current first volume and the second volume is significant, and the second volume has not exceeded the threshold that could harm hearing. At this time, the first prompt message is sent to the user, so as to adjust the first volume at which the first audio data is played by the first earphone to the second volume upon receiving the confirmation command for the first prompt message from the user.

In the present embodiment, when the first volume at which the first audio data is played by the first earphone is inconsistent with the second volume at which the first audio data is played by the second earphone, acquiring the volume offset reflecting the difference between the first volume and the second volume. When the volume offset is greater than or equal to the first threshold and the second volume is less than the second threshold, the first prompt message is sent to the user, so as to adjust the first volume at which the first audio data is played by the first earphone to the second volume after receiving the confirmation command for the first prompt message from the user. In this way, it is possible to avoid negatively impacting the audio experience of the user due to a large change in volume while achieving adaptive volume adjustment for the earphone.

In one embodiment, upon receiving the second volumes at which the first audio data is played by N second earphones sent from the electronic device, said "adjusting the first volume at which the first audio data is played, based on the second volume at which the first audio data is played by the at least one second earphone" may further include: step S3100 to step S3300.

Step S3100, determine a third volume based on the second volumes at which the first audio data is played by each of the N second earphones, wherein N is a positive integer greater than 1.

The third volume may reflect the volume level at which the N second earphones play the first audio data.

Exemplarily, the average value of the second volumes at which the first audio data is played by the N second earphones is determined to be the third volume. For example, the second volumes at which the first audio data is played by the N second earphones are volt (i=1, 2, 3, . . . , n), and the third volume V3 is $$vol_{avg} = \frac{\sum_1^n vol_i^1}{n}.$$

Exemplarily, the median of the second volumes at which the first audio data is played by the N second earphones is taken as the third volume.

Exemplarily, the maximum and minimum values of the second volumes at which the first audio data is played by the N second earphones are discarded, and the average value of the second volumes at which the first audio data is played by the remaining second earphones is taken as the third volume.

In the present embodiment, multiple methods for determining the third volume are provided, allowing the user to set according to actual needs, making the volume adjustment method more flexible and enhancing the user experience.

Step S3200, when the first volume is inconsistent with the third volume, determine a volume offset based on the first volume and the third volume.

In the present embodiment, the case where the first volume is inconsistent with the third volume may include the case where the first volume is inconsistent with the third volume that the first earphone first acquired, or it may include the case where the first volume is inconsistent with the third volume determined according to the adjusted second volume.

In the present embodiment, the volume offset may reflect the difference between the first volume and the third volume. Exemplarily, the first volume at which the first audio data is played by the first earphone is $vol_0$, the third volume is $vol_{avg}$, and the volume offset may be a percentage of the absolute value of the difference between the first volume and the third volume relative to the first volume, that is, $$\frac{|vol_0 - vol_{avg}|}{vol_0} \times 100\%.$$

Step S3300, when the volume offset is less than the first threshold and the third volume is less than the second threshold, adjust the first volume at which the first audio data is played to the third volume.

In the present embodiment, the first threshold may be the maximum adjustment range for adaptively adjusting the first volume. The first threshold may be 10%. It should be noted that the first threshold may be set by those skilled in the art based on actual experience, which is not limited herein.

The second threshold may be the maximum volume allowed for adaptive adjustment, it indicates that the second threshold may be the maximum volume that does not harm human hearing. For example, the second threshold may be 80% of the maximum volume that the earphone may play. It should be noted herein that the second threshold may be set by those skilled in the art based on actual experience, which is not limited herein.

When the volume offset is less than the first threshold and the third volume is less than the second threshold, it indicates that the difference between the current first volume and the third volume is minor, and the third volume has not exceeded the threshold that could harm hearing. It is considered that the change in the first volume will not impact the audio experience of the user of the first earphone. At this time, the first volume at which the first audio data is played by the first earphone can be automatically adjusted to the third volume.

In the present embodiment, when the first earphone shares audio with multiple second earphones, the third volume is determined based on the second volumes at which the first audio data is played by the multiple second earphones. Then, when the first volume at which the first audio data is played by the first earphone is inconsistent with the third volume, acquire a volume offset reflecting the difference between the first and third volumes. When the volume offset is less than the first threshold and the third volume is less than the second threshold, the first volume at which the first audio data is played by the first earphone is adjusted to the third volume. In this way, after the users of the multiple second earphones adjust the volume according to the application environment, the first earphone may adaptively adjust the volume based on the volumes at which the first audio data is played by the multiple second earphones. This improves the precision of volume adjustment and enhances the audio experience of the user. Additionally, it eliminates the need for manual adjustment by the user, thus providing the user a more convenient audio experience.

In one embodiment, after said "determining a volume offset based on the first volume and the third volume", the method further includes: when the volume offset is greater than or equal to the first threshold and the third volume is less than the second threshold, issuing a second prompt message; and upon receiving a confirmation command for the second prompt message from a user, adjusting the first volume at which the first audio data is played to the third volume.

In the present embodiment, by issuing the second prompt message, the user can be reminded to confirm whether to adjust the volume at which the first audio data is played. The second prompt message may be a voice prompt message or vibration prompt message, etc. For example, the second prompt message might read "Please confirm whether to adjust the current playback volume."

When the volume offset is greater than or equal to the first threshold and the third volume is less than the second threshold, it indicates that a difference between the first and third volumes is significant, and the third volume has not exceeded the threshold that could harm hearing. At this time, a second prompt message is sent to the user, so as to adjust the first volume at which the first audio data is played by the first earphone to the third volume upon receiving the confirmation command for the second prompt message from the user.

In the present embodiment, when sharing audio between the first earphone and multiple second earphones, the third volume is determined based on the second volumes at which the first audio data is played by the multiple second earphones. Then, when the first volume at which the first audio data is played by the first earphone is inconsistent with the third volume, acquire a volume offset reflecting the difference between the first volume and the third volume. When the volume offset is greater than or equal to the first threshold and the third volume is less than the second threshold, a second prompt message is sent to the user, so as to adjust the first volume at which the first audio data is played by the first earphone to the third volume after receiving the confirmation instruction for the second prompt message from the user. In this way, it is possible to avoid impacting the audio experience of the user due to a large change in volume while achieving adaptive volume adjustment for the earphone.

According to the present disclosure, when the electronic device shares audio with at least one second earphone through the first earphone, acquire the first volume at which the first audio data is played by the first earphone sent from the electronic device, and receive the second volume at which the first audio data is played by at least one second earphone sent from the electronic device, so as to adjust the volume of the first earphone based on the second volume at which the first audio data is played by at least one second earphone. In this way, since the second volume at which the first audio data is played by at least one second earphone may reflect the noise in the application environment, it is possible to adaptively adjust the volume based on the second volume at which the first audio data is played by at least one second earphone and automatically adjust the volume of the earphone with high precision, thereby providing a more convenient audio experience for the user. Furthermore, the audio adjustment method provided in the present embodiment has lower demands on the hardware conditions and algorithms of the earphones, and has wider applicability.

Figure 3:
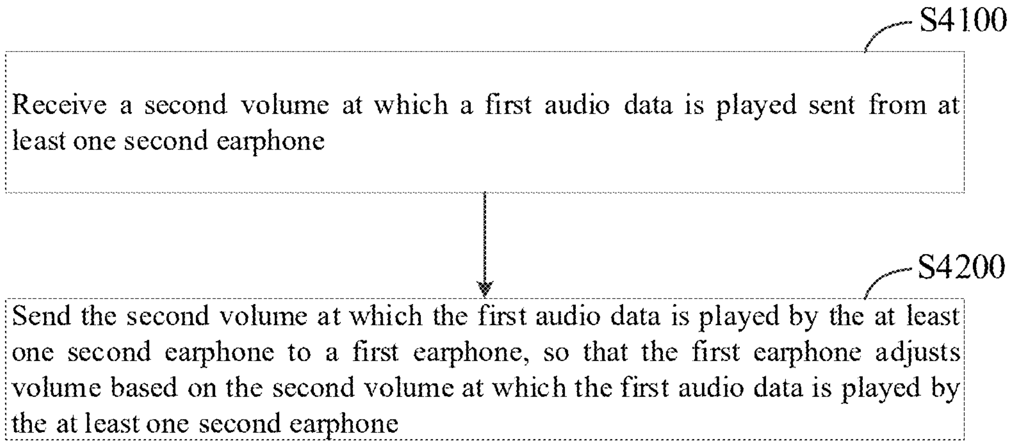
FIG. 3 is a schematic flowchart of a volume adjustment method according to another embodiment.

The present disclosure also provides a volume adjustment method, which may be implemented by the electronic device 1000 as shown in FIG. 1. As shown in FIG. 3, the volume adjustment method includes the following steps: step S4100 to step S4200.

Step S4100, receive a second volume at which a first audio data is played, sent from at least one second earphone.

In the present embodiment, the electronic device has an audio sharing function. When the audio sharing function is enabled, the electronic device may share audio through the first earphone and at least one second earphone. Specifically, the electronic device may act as the output end of audio data in the audio sharing scenario, while the second earphone may act as one or more receiving ends of audio data in the audio sharing scenario. The first audio data may be the audio data intended for audio sharing.

The second volume may be the volume at which the first audio data is played by the second earphone. In specific implementation, when the audio sharing function of the electronic device is enabled, the electronic device may establish a communication connection with the second earphone, and send the first audio data to the second earphone based on the communication connection between the electronic device and the second earphone, enabling the second earphone to play the first audio data. Additionally, based on the communication connection between the electronic device and the second earphone, the second earphone may report the second volume at which the first audio data is played back to the electronic device. Subsequently, based on the communication connection between the electronic device and the first earphone, the electronic device may send the second volume at which the first audio data is played by the second earphone to the first earphone.

It is understood herein that, taking multiple second earphones as an example, when the audio sharing function is enabled, each of the multiple second earphones must report the second volume at which the first audio data is played to the electronic device.

It is also understood that the second earphone may report the second volume at which the first audio data is played at a preset time interval, or it may report the second volume when there is a change in the second volume at which the first audio data is played.

Step S4200, send the second volume at which the first audio data is played by the at least one second earphone to a first earphone, so that the first earphone adjusts volume based on the second volume at which the first audio data is played by the at least one second earphone.

In the present embodiment, the electronic device shares audio through the first earphone and at least one second earphone. The first earphone and at least one second earphone are in the same application environment. Based on this, the electronic device sends the second volume at which the first audio data is played by at least one second earphone to the first earphone, so that the first earphone can adjust the first volume at which the first audio data is played by the first earphone based on the second volume at which the first audio data is played by at least one second earphone, thus achieving adaptive volume adjustment for the earphone.

According to the present disclosure, when the electronic device shares audio through the first earphone with at least one second earphone, the electronic device can receive the second volume at which the first audio data is played by at least one second earphone, and send the second volume at which the first audio data is played by at least one earphone to the first earphone, so that the first earphone adjusts the volume based on the second volume at which the first audio data is played by at least one second earphone. In this way, since the second volume at which the first audio data is played by at least one second earphone can reflect the noise in the application environment, it is possible to adaptively adjust the volume based on the second volume at which the first audio data is played by at least one second earphone, and automatically adjust the volume of the earphone with high precision, thereby providing a more convenient audio experience for the user. Furthermore, the audio adjustment method provided in the present embodiment has lower demands on the hardware conditions and algorithms of the earphones, and has wider applicability.

In one embodiment, before said "receiving a second volume at which a first audio data is played sent from at least one second earphone", the method may further include: establishing a communication connection with the at least one second earphone when an audio sharing function is enabled; sending the first audio data to the at least one second earphone based on the established communication connection with the at least one second earphone, so that the at least one second earphone plays the first audio data.

In one embodiment, the step of enabling the audio sharing function may include: receiving a first input from a first user to the electronic device; in response to the first input, enabling the audio sharing function of the electronic device.

In the present embodiment, when the audio sharing function is enabled, the electronic device may share audio through the first earphone and at least one second earphone.

The first input may be used to enable the audio sharing function of the electronic device. Exemplarily, the first input may be a user's click input on a target control, or a specific gesture input by the user, which may be specifically determined based on actual usage requirements, and is not limited herein. The specific gestures in the present disclosure may be any of a single-click gesture, a swipe gesture, or a drag gesture; the click input in the present disclosure may be a single-click input, a double-click input, or any number of click inputs, and may also be a long press input or a short press input.

Exemplarily, when a user needs to share audio through the electronic device, he or she may open the system settings of the electronic device to perform the operation. Specifically, the Bluetooth settings interface of the electronic device may include options for enabling Bluetooth and audio sharing, as well as a device list containing settings for devices paired with the electronic device (such as a first earphone, at least one second earphone, a smart speaker, etc.). When enabling the Bluetooth function of the electronic device, the first user may enable the audio sharing function of the electronic device through the audio sharing option on the Bluetooth settings interface. Once the audio sharing function of the electronic device is enabled, enter the audio sharing interface, which includes a device list of devices already paired with the electronic device. The first user may select at least one second earphone that has been paired with the electronic device from the device list, so that the electronic device connects with at least one second earphone, thereby achieving audio sharing through the first earphone and at least one second earphone, allowing the first user to play audio data with the first earphone while the second user plays the same audio data with the second earphone.

In the present embodiment, the electronic device has an audio sharing function, and the user can enable the audio sharing function of the electronic device as needed. This allows for audio sharing between the first earphone and multiple second earphones, enabling different users to share audio data with each other and providing users with a rich audio experience.

Below is a specific example to illustrate the volume adjustment method.

Step S501, when the audio sharing function of the electronic device is enabled, the first earphone acquires the first volume at which the first audio data sent from the electronic device is played, that is, $vol_0$;

Step S502, the first earphone receives the second volumes at which the first audio data sent from the electronic device is played by the N second earphones, that is, volt (i=1, 2, 3, . . . , n);

Step S503, determine the third volume based on the second volumes at which the first audio data is played by the N second earphones, that is, $$vol_{avg} = \frac{\sum_1^n vol_i^1}{n};$$

Step S504, when the first volume is inconsistent with the third volume, determine a volume offset based on the first volume and the third volume, that is, $$\text{offset}_1 = \frac{|vol_0 - vol_{avg}|}{vol_0} \times 100\%;$$

Step S505, when the volume offset is less than the first threshold and the third volume is less than the second threshold, update the volume at which the first audio data is played by the first earphone to the third volume $vol_{avg}$;

Step S506, when the second volumes at which the first audio data is played by the second earphones change, the first earphone receives the adjusted second volumes corresponding to the N second earphones sent from the electronic device, that is, $$vol_i^2$$

(i=1, 2, 3, . . . , n);

Step S507, based on the adjusted second volume corresponding to the N second earphones, update the third volume to acquire the updated third volume, that is, $$vol_{avg} = \frac{\sum_1^n vol_i^2}{n};$$

In this step, if any of the N second earphones has an adjusted second volume greater than or equal to the second threshold, update the third volume based on the corresponding pre-update second volume to acquire the updated third volume.

Step S508, based on the updated third volume, update the volume offset to acquire the updated volume offset, that is, $$\text{offset}_2 = \frac{|vol_0 - vol_{avg}|}{vol_0} \times 100\%;$$

Step S509, if the updated volume offset is less than the first threshold and the updated third volume is less than the second threshold, adjust the volume at which the first audio data is played by the first earphone to the updated third volume.

In this example, since the second volume at which the first audio data is played by at least one second earphone may reflect the noise in the application environment, it is possible to adaptively adjust the volume based on the second volume at which the first audio data is played by at least one second earphone and automatically adjust the volume of the earphone with high precision, thereby providing a more convenient audio experience for the user. Furthermore, the audio adjustment method provided in the present embodiment has lower demands on the hardware conditions and algorithms of the earphones, and has wider applicability.

Embodiments of Apparatus

Figure 4:
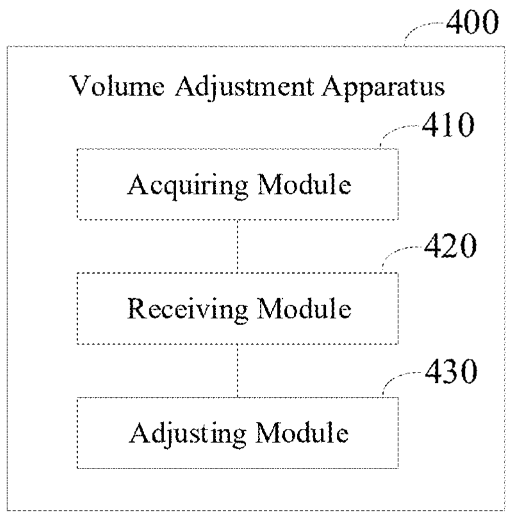
FIG. 4 is a schematic diagram of a hardware structure of the volume adjustment apparatus according to one embodiment.

The present disclosure provides a volume adjustment apparatus applied to a first earphone. As shown in FIG. 4, the volume adjustment apparatus 400 may include an acquiring module 410, a receiving module 420, and an adjusting module 430.

The acquiring module 410 may be configured for acquiring a first volume at which a first audio data sent from an electronic device is played, upon receiving the first audio data.

The receiving module 420 may be configured for receiving a second volume at which the first audio data is played by at least one second earphone, sent from the electronic device.

The adjusting module 430 may be configured for adjusting the first volume at which the first audio data is played based on the second volume at which the first audio data is played by the at least one second earphone.

In one embodiment, upon receiving a second volume at which the first audio data is played by one second earphone sent from the electronic device, the adjusting module 430 includes:

- a first determining unit configured for when the first volume is inconsistent with the second volume, determining a volume offset based on the first volume and the second volume;
- a first adjusting unit configured for when the volume offset is less than a first threshold and the second volume is less than a second threshold, adjusting the first volume at which the first audio data is played to the second volume.

In one embodiment, upon receiving a second volume at which the first audio data is played by one second earphone sent from the electronic device, the adjusting module 430 further includes:

- a first sending unit configured for when the volume offset is greater than or equal to the first threshold and the second volume is less than the second threshold, issuing a first prompt message;
- a second adjusting unit configured for upon receiving a confirmation command for the first prompt message from a user, adjusting the first volume at which the first audio data is played to the second volume.

In one embodiment, upon receiving the second volumes at which the first audio data is played by N second earphones sent from the electronic device, the adjusting module 430 further includes:

a second determining unit configured for determining a third volume based on the second volumes at which the first audio data is played by each of the N second earphones, wherein N is a positive integer greater than 1;

a third determining unit configured for when the first volume is inconsistent with the third volume, determining a volume offset based on the first volume and the third volume;

a third adjusting unit configured for when the volume offset is less than the first threshold and the third volume is less than the second threshold, adjusting the first volume at which the first audio data is played to the third volume.

In one embodiment, upon receiving the second volumes at which the first audio data is played by N second earphones sent from the electronic device, the adjusting module 430 further includes:

a second sending unit configured for when the volume offset is greater than or equal to the first threshold and the third volume is less than the second threshold, issuing a second prompt message;

a fourth adjusting unit configured for upon receiving a confirmation command for the second prompt message from a user, adjusting the first volume at which the first audio data is played to the third volume.

According to the present disclosure, when the electronic device shares audio through the first earphone with at least one second earphone, the electronic device may receive the second volume at which the first audio data is played by at least one second earphone, and send the second volume at which the first audio data is played by at least one earphone to the first earphone, so that the first earphone adjusts the volume based on the second volume at which the first audio data is played by at least one second earphone. In this way, since the second volume at which the first audio data is played by at least one second earphone may reflect the noise in the application environment, it is possible to adaptively adjust the volume based on the second volume at which the first audio data is played by at least one second earphone and automatically adjust the volume of the earphone with high precision, thereby providing a more convenient audio experience for the user. Furthermore, the audio adjustment method provided in the present embodiment has lower demands on the hardware conditions and algorithms of the earphones, and has wider applicability.

Figure 5:
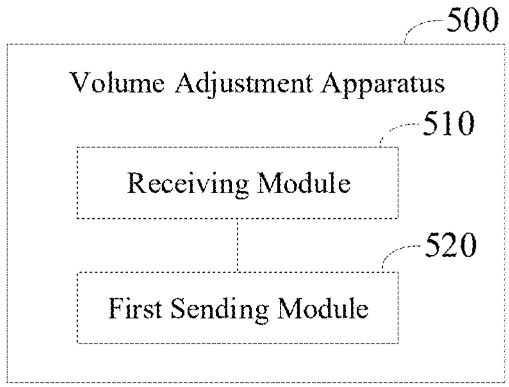
FIG. 5 is a schematic diagram of a hardware structure of a volume adjustment apparatus according to another embodiment.

The present disclosure also provides a volume adjustment apparatus applied to an electronic device. As shown in FIG. 5, the volume adjustment apparatus 500 may include a receiving module 510 and a first sending module 520.

The receiving module 510 may be configured for receiving a second volume at which a first audio data is played, sent from at least one second earphone;

the first sending module 520 may be configured for sending the second volume at which the first audio data is played by the at least one second earphone to a first earphone, so that the first earphone adjusts volume based on the second volume at which the first audio data is played by the at least one second earphone.

In one embodiment, the volume adjustment apparatus 500 further includes:

an establishing module configured for establishing a communication connection with the at least one second earphone when an audio sharing function is enabled;

a second sending module configured for sending the first audio data to the at least one second earphone based on the established communication connection with the at least one second earphone, so that the at least one second earphone plays the first audio data.

According to the present disclosure, when the electronic device shares audio through the first earphone and at least one second earphone, the electronic device may receive the second volume at which the first audio data is played by at least one second earphone, and send the second volume at which the first audio data is played by at least one earphone to the first earphone, so that the first earphone adjusts the volume thereof based on the second volume at which the first audio data is played by at least one second earphone. In this way, since the second volume at which the first audio data is played by at least one second earphone may reflect the noise in the application environment, it is possible to adaptively adjust the volume based on the second volume at which the first audio data is played by at least one second earphone and automatically adjust the volume of the earphone with high precision, thereby providing a more convenient audio experience for the user. Furthermore, the audio adjustment method provided in the present embodiment has lower demands on the hardware conditions and algorithms of the earphones, and has wider applicability.

Embodiments of Earphone

Figure 6:
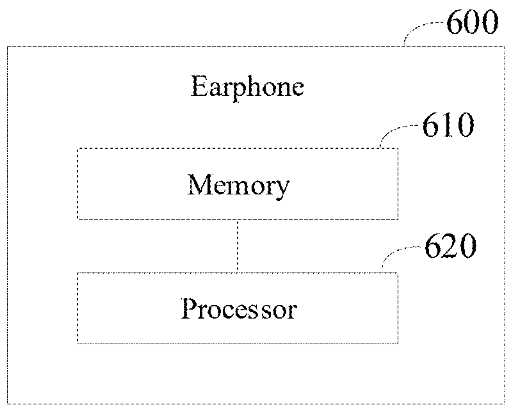
FIG. 6 is a schematic diagram of a hardware structure of an earphone according to one embodiment.

FIG. 6 is a schematic diagram of a hardware structure of an earphone according to one embodiment. As shown in FIG. 6, the earphone 600 includes a memory 610 and a processor 620.

The memory 610 may be configured for storing executable computer instructions.

The processor 620 may be configured for executing the volume adjustment method of the embodiments of the method of the present disclosure according to the control of the executable computer instructions.

In another embodiment, the earphone 600 may include the aforementioned volume adjustment apparatus 400.

In one embodiment, the various modules of the aforementioned volume adjustment apparatus 400 may be implemented through the processor 620 running the computer instructions stored in the memory 610.

According to the present disclosure, since the second volume at which the first audio data is played by at least one second earphone may reflect the noise in the application environment, it is possible to adaptively adjust the volume based on the second volume at which the first audio data is played by at least one second earphone and automatically adjust the volume of the earphone with high precision, thereby providing a more convenient audio experience for the user. Furthermore, the audio adjustment method provided in the present embodiment has lower demands on the hardware conditions and algorithms of the earphones, and has wider applicability.

Embodiments of Device

Figure 7:
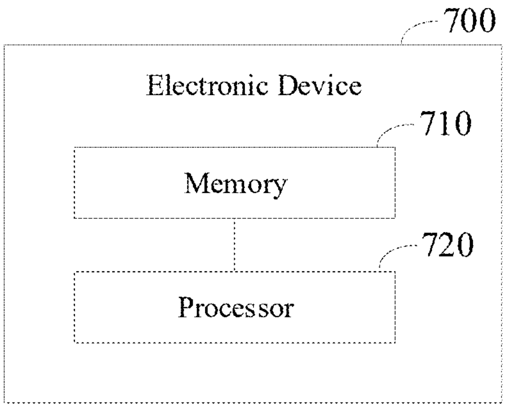
FIG. 7 is a schematic diagram of a hardware structure of an electronic device according to one embodiment.

FIG. 7 is a schematic diagram of a hardware structure of an electronic device according to one embodiment. As shown in FIG. 7, the electronic device 700 includes a memory 710 and a processor 720.

The memory 710 may be configured for storing executable computer instructions.

The processor 720 may be configured for executing a volume adjustment method of the embodiments of the method of the present disclosure according to the control of the executable computer instructions.

In another embodiment, the electronic device 700 may include the aforementioned volume adjustment apparatus 500.

In one embodiment, the various modules of the aforementioned volume adjustment apparatus 500 may be implemented through the processor 720 running the computer instructions stored in the memory 710.

According to the present disclosure, since the second volume at which the first audio data is played by at least one second earphone may reflect the noise in the application environment, it is possible to adaptively adjust the volume based on the second volume at which the first audio data is played by at least one second earphone and automatically adjust the volume of the earphone with high precision, thereby providing a more convenient audio experience for the user. Furthermore, the audio adjustment method provided in the present embodiment has lower demands on the hardware conditions and algorithms of the earphones, and has wider applicability.

Computer-Readable Storage Medium

The present disclosure also provides a computer-readable storage medium storing computer instructions thereon, which execute the volume adjustment method provided by the present disclosure when run by a processor.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It is well-known to a person skilled in the art that the implementations of using hardware, using software or using the combination of software and hardware can be equivalent.

Embodiments of the present disclosure have been presented for purposes of illustration, but are not intended to be exhaustive or limited to the embodiments disclosed. Numerous modifications and changes will be apparent to those skilled in the art without departing from the scope and spirit of the illustrated embodiments. The terminology used herein was chosen to best explain the principles of the embodiments, the practical application or technical improvement over technologies found in the marketplace, or to enable others of ordinary skill in the art to understand the embodiments disclosed herein. The scope of the present disclosure is defined by the appended claims.

The invention claimed is:

1. A volume adjustment method applied to a first earphone, comprising:
- acquiring a first volume at which a first audio data sent from an electronic device is played, upon receiving the first audio data;
- receiving a second volume sent from the electronic device at which the first audio data is played by at least one second earphone; and
- adjusting the first volume at which the first audio data is played, based on the second volume at which the first audio data is played by the at least one second earphone.

2. The method of claim 1, wherein upon receiving a second volume sent from the electronic device at which the first audio data is played by one second earphone, said adjusting the first volume at which the first audio data is played, based on the second volume at which the first audio data is played by the at least one second earphone comprises:
- when the first volume is inconsistent with the second volume, determining a volume offset based on the first volume and the second volume; and
- when the volume offset is less than a first threshold and the second volume is less than a second threshold, adjusting the first volume at which the first audio data is played to the second volume.

3. The method of claim 2, wherein after said determining a volume offset based on the first volume and the second volume, the method further comprises:
- when the volume offset is greater than or equal to the first threshold and the second volume is less than the second threshold, announcing a first prompt message; and
- upon receiving a confirmation command from a user in response to the first prompt message, adjusting the first volume at which the first audio data is played to the second volume.

4. The method of claim 1, wherein upon receiving the second volumes sent from the electronic device at which the first audio data is played by N second earphones, said adjusting the first volume at which the first audio data is played, based on the second volume at which the first audio data is played by the at least one second earphone comprises:
- determining a third volume based on the second volumes at which the first audio data is played by each of the N second earphones, wherein N is a positive integer greater than 1;
- when the first volume is inconsistent with the third volume, determining a volume offset based on the first volume and the third volume; and
- when the volume offset is less than the first threshold and the third volume is less than the second threshold, adjusting the first volume at which the first audio data is played to the third volume.

5. The method of claim 4, wherein after said determining a volume offset based on the first volume and the third volume, the method further comprises:
- when the volume offset is greater than or equal to the first threshold and the third volume is less than the second threshold, announcing a second prompt message; and
- upon receiving a confirmation command from a user in response to the second prompt message, adjusting the first volume at which the first audio data is played to the third volume.

6. A volume adjustment method applied to an electronic device, comprising:
- receiving a second volume sent from at least one second earphone at which a first audio data is played; and
- sending the second volume at which the first audio data is played by the at least one second earphone to a first earphone, so that the first earphone is adapted to adjusts volume based on the second volume at which the first audio data is played by the at least one second earphone.

7. The method of claim 6, wherein before said receiving a second volume sent from at least one second earphone at which a first audio data is played, the method further comprises:
- establishing a communication connection with the at least one second earphone when an audio sharing is actuated; and
- sending the first audio data to the at least one second earphone based on the established communication connection with the at least one second earphone, so that the at least one second earphone is adapted to plays the first audio data.

8. A volume adjustment apparatus applied to a first earphone, configured for executing a volume adjustment method of claim 1, the apparatus comprising:
- an acquiring module configured for acquiring a first volume at which a first audio data sent from an electronic device is played, upon receiving the first audio data;

a receiving module configured for receiving a second volume sent from the electronic device at which the first audio data is played by at least one second earphone; and an adjusting module configured for adjusting the first volume at which the first audio data is played, based on the second volume at which the first audio data is played by the at least one second earphone.

9. A volume adjustment apparatus applied to an electronic device, configured for executing a volume adjustment method of claim 6, the apparatus comprising:

a receiving module configured for receiving a second volume sent from at least one second earphone at which a first audio data is played; and a first sending module configured for sending the second volume at which the first audio data is played by the at least one second earphone to a first earphone, so that the first earphone is adapted to adjusts volume based on the second volume at which the first audio data is played by the at least one second earphone.

10. An earphone, comprising:

a memory configured for storing an executable computer instruction; and a processor configured for executing a volume adjustment method of claim 1, based on the executable computer instruction.

11. An electronic device, comprising:

a memory configured for storing an executable computer instruction; and a processor configured for executing a volume adjustment method of claim 6 based on the executable computer instruction.

12. A computer-readable storage medium storing a computer instruction thereon, which, when run by a processor, is adapted to executes a volume adjustment method of claim 1.

* * * * *